United States Patent
Minamibori

(10) Patent No.: US 9,502,695 B2
(45) Date of Patent: Nov. 22, 2016

(54) MOLDING PACKAGING MATERIAL

(71) Applicant: Showa Denko Packaging Co., Ltd., Isehara-shi, Kanagawa (JP)

(72) Inventor: Yuji Minamibori, Hikone (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 320 days.

(21) Appl. No.: 14/269,270

(22) Filed: May 5, 2014

(65) Prior Publication Data

US 2014/0335402 A1 Nov. 13, 2014

(30) Foreign Application Priority Data

| May 8, 2013 | (JP) | ................................. 2013-098136 |
| Mar. 11, 2014 | (JP) | ................................. 2014-047426 |

(51) Int. Cl.

| H01M 2/02 | (2006.01) |
| B32B 15/092 | (2006.01) |
| B32B 15/095 | (2006.01) |

(52) U.S. Cl.
CPC ........... *H01M 2/0292* (2013.01); *H01M 2/026* (2013.01); *H01M 2/0262* (2013.01); *B32B 15/092* (2013.01); *B32B 15/095* (2013.01); *H01M 2/0287* (2013.01); *H01M 2002/0297* (2013.01); *Y10T 428/24372* (2015.01); *Y10T 428/24405* (2015.01); *Y10T 428/24413* (2015.01); *Y10T 428/24421* (2015.01)

(58) Field of Classification Search
CPC ............ H01M 2/0292; H01M 2/0287; B32B 15/095; B32B 15/092
See application file for complete search history.

(56) References Cited

U.S. PATENT DOCUMENTS

| 6,235,458 B1 * | 5/2001 | Hashimoto | G03C 1/795 428/220 |
| 2006/0288648 A1* | 12/2006 | Thurber | B24D 3/28 51/295 |
| 2007/0116910 A1* | 5/2007 | Polykarpov | B32B 7/04 428/35.2 |
| 2012/0015145 A1* | 1/2012 | Depres | B32B 15/08 428/143 |
| 2012/0135301 A1* | 5/2012 | Akita | H01M 2/0212 429/185 |
| 2014/0087241 A1 | 3/2014 | Kuramoto et al. | |

FOREIGN PATENT DOCUMENTS

| JP | 2000-123799 A | 4/2000 | |
| JP | 2011-054563 A | 3/2011 | |
| WO | 2011/016506 * | 2/2011 | ............ B32B 15/08 |
| WO | 2012/133663 A1 | 10/2012 | |

* cited by examiner

*Primary Examiner* — Rena L Dye
(74) *Attorney, Agent, or Firm* — Keating and Bennett, LLP

(57) ABSTRACT

A molding packaging material including a matte coat layer having excellent formability, chemical resistance, solvent resistance, and printability is provided. The molding packaging material 1 includes an outer base material 13 made of a heat-resistant resin, an inner sealant layer 16 made of a thermoplastic resin, a metal foil layer 11 arranged between the outer base material 13 and the inner sealant layer 16, and a matte coat layer 14 formed on one side of the outer base material opposite to the other side thereof to which the metal foil layer 11 is arranged. The matte coat layer 14 is made from a resin composition containing a base compound resin including a phenoxy resin and a urethane resin, a curing agent, and solid fine particles.

14 Claims, 1 Drawing Sheet

MOLDING PACKAGING MATERIAL

TECHNICAL FIELD

The present invention relates to a molding packaging material and a molded case preferably used as a case for stationary type lithium ion secondary batteries or lithium ion secondary batteries for use in, e.g., laptops, mobile phones, or automobiles, and also preferably used as a packaging material for, e.g., food products or pharmaceutical products.

TECHNICAL BACKGROUND

As the molding packaging material mentioned above, a packaging material is known, in which a metal foil layer as a barrier layer is arranged between an outer layer made of a heat-resistant resin and an inner layer made of a thermoplastic resin, and these layers are integrally laminated (see Patent Documents 1 to 3). Further, in the packaging material disclosed by Patent Documents 2 and 3, it is described to improve formability and durability by subjecting the outer layer to matte processing or by forming a matte coat layer. It is also described that forming a matte coat layer improves the quality of external appearance of the packaging material and prevents the packaging materials from being adhered with each other to attain easy handling.

The matte coat layer is made of a resin composition in which solid fine particles are dispersed in a resin, wherein, as the resin, an acrylic resin, a urethane-based resin, an alkyd-based resin, a fluorine-based resin, etc., are used, and as the solid fine particles, silica, kaolin, etc., are used.

PRIOR ART DOCUMENT

Patent Document

Patent Document 1: Japanese Unexamined Laid-open Patent Application Publication No. 2000-123799
Patent Document 2: PCT International Publication WO 2012/133663 A1
Patent Document 3: Japanese Unexamined Laid-open Patent Application Publication No. 2011-054563

SUMMARY OF THE INVENTION

Problems to be Solved by the Invention

Resins used in the matte coat layer each have characteristics.

A urethane-based resin is flexible and therefore excellent formability can be obtained, but there are disadvantages in chemical resistance and solvent resistance. In a packaging material for secondary battery cases, in the manufacturing step of the battery, there is a risk that electrolytes adhere to the outer layer of the packaging material. Therefore, the matte coat layer, which will become the outermost layer of the case, is required to have chemical resistance and solvent resistance to prevent deterioration of the quality of external appearance due to the adhesion of electrolytes.

Also, a fluorine-based resin is a resin excellent in chemical resistance and solvent resistance, but there is a disadvantage in print ink adherence. Therefore, blurring may occur in characters and/or barcodes to be printed on a product surface.

Means to Solve the Problems

In view of the aforementioned technical background, some preferred embodiments of the present invention provide a molding packaging material having a matte coat layer excellent in formability, chemical resistance, solvent resistance, and printability, and also provide its related technologies.

That is, some preferred embodiments of the present invention have the structure as described in the following Items 1 to 16.

1. A molding packaging material comprising:
   an outer base material made of a heat-resistant resin;
   an inner sealant layer made of a thermoplastic resin;
   a metal foil layer arranged between the outer base material and the inner sealant layer; and
   a matte coat layer formed on one side of the outer base material opposite to the other side thereof on which the metal foil layer is arranged,
   wherein the matte coat layer is made of a resin composition containing a base compound resin including a phenoxy resin and a urethane resin, a curing agent, and solid fine particles.

2. The molding packaging material as recited in the aforementioned Item 1, wherein a mass ratio of the phenoxy resin and the urethane resin in the base compound resin is 0.6 to 1.6 urethane resin to 1 phenoxy resin.

3. The molding packaging material as recited in the aforementioned Item 2, wherein the mass ratio of the phenoxy resin and the urethane resin is 0.8 to 1.4 urethane resin to 1 phenoxy resin.

4. The molding packaging material as recited in any one of the aforementioned Items 1 to 3, wherein an average particle size of the solid fine particle is 1 to 10 μm.

5. The molding packaging material as recited in any one of the aforementioned Items 1 to 4, wherein a content rate of the solid fine particles in the resin composition is 0.1 to 60 mass %.

6. The molding packaging material as recited in any one of the aforementioned Items 1 to 5, wherein the solid fine particles contain one or more types of inorganic fine particles selected from the group consisting of silica, alumina, calcium oxide, calcium carbonate, calcium sulfate, calcium silicate, and carbon black.

7. The molding packaging material as recited in any one of the aforementioned Items 1 to 6, wherein the solid fine particles contain one or more types of organic fine particles selected from the group consisting of an acrylic acid ester-based compound, a polystyrene-based compound, an epoxy-based resin, a polyamide-based compound and a cross-linked substance thereof.

8. The molding packaging material as recited in any one of the aforementioned Items 1 to 7, wherein the outer base material is constituted by a biaxially-stretched polyamide film.

9. The molding packaging material as recited in any one of the aforementioned Items 1 to 7, wherein the outer base material is constituted by a biaxially-stretched polyethylene terephthalate film.

10. The molding packaging material as recited in any one of the aforementioned Items 1 to 7, wherein the outer base material is constituted by a multi-layer film in which a polyethylene terephthalate film and a polyamide film are laminated.

11. The molding packaging material as recited in any one of the aforementioned Items 1 to 10, wherein the inner sealant layer is constituted by a thermoplastic resin non-stretched film.

12. The molding packaging material as recited in any one of the aforementioned Items 1 to 11, wherein the outer base material and the metal foil layer are joined by a two-liquid curing type urethane-based adhesive agent containing a polyol component and an isocyanate component.

13. The molding packaging material as recited in any one of the aforementioned Items 1 to 12, wherein a chemical conversion coating film is formed on at least one of surfaces of the metal foil.

14. The molding packaging material as recited in any one of the aforementioned Items 1 to 13, wherein the metal foil layer is constituted by an aluminum foil.

15. A molded case formed by deep-drawing or bulging a molding packaging material as recited in any one of the aforementioned Items 1 to 14.

16. The molded case as recited in the aforementioned Item 15 to be used as a battery case.

According to the embodiment as recited in the aforementioned item 1, as the base component resin of the resin component of the resin composition forming the matte coat layer, a mixed resin including a phenoxy resin having high stability and a urethane resin having high flexibility is used, which makes it possible to obtain a molding packaging material having formability, chemical resistance, and solvent resistance. Also, since a phenoxy resin and a urethane resin are resins having excellent printability, the matte coat layer can have excellent printability as well as the aforementioned properties. Also, since the resin composition contains solid fine particles, the slidability of the matte coat layer improves, thereby improving formability. By adding solid fine particles, the packaging material becomes less sticky, resulting in easy handling, and the luster of the resin can be suppressed, resulting in subdued external appearance.

According to the embodiment as recited in the aforementioned item 2, the mixture ratio of the phenoxy resin and the urethane resin in the base component resin results in a matte coat layer especially excellent in the balance of formability, chemical resistance, and solvent resistance.

According to the embodiment as recited in the aforementioned item 3, a matte coat layer can have an even better balance of formability, chemical resistance, and solvent resistance.

According to the embodiment as recited in the aforementioned item 4, since the particle size of the solid fine particle contained in the resin composition is defined so as to fall within a predetermined range, the matte coat layer can have especially excellent formability.

According to the embodiment as recited in the aforementioned item 5, since the content rate of the solid fine particles contained in the resin composition is defined so as to fall within a predetermined range, the matte coat layer can have especially good formability as well as external appearance.

According to the embodiment as recited in the aforementioned item 6 and 7, since specific solid fine particles are used in the matte coat layer, the effects of the aforementioned solid fine particles are excellent.

According to the embodiment as recited in the aforementioned item 8, 9, and 10, since a specific film is used for the outer base material, the molding packaging material can have especially excellent formability and strength.

According to the embodiment as recited in the aforementioned item 11, since a specific film is used as the inner sealant layer, the molding packaging material can be especially excellent in chemical resistance and heat sealing characteristics.

According to the embodiment as recited in the aforementioned item 12, since the outer base material as the resin layer and the metal foil layer are joined by a specific adhesive agent, the molding packaging material can have excellent adhesive strength.

According to the embodiment as recited in the aforementioned item 13, since the chemical conversion coating film is formed on the surface of the metal foil, the molding packaging material can have excellent corrosion-resistance.

According to the embodiment as recited in the aforementioned item 14, the aforementioned effects can be obtained in a molding packaging material in which the aluminum foil is a barrier layer.

According to the embodiment as recited in the aforementioned item 15, a molding case can have formability, chemical resistance, and solvent resistance, and also excellent printability.

According to the embodiment as recited in the aforementioned item 16, a battery case can have formability, chemical resistance, and solvent resistance, and also good printability.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

[Molding Packaging Material]

Figure 1:
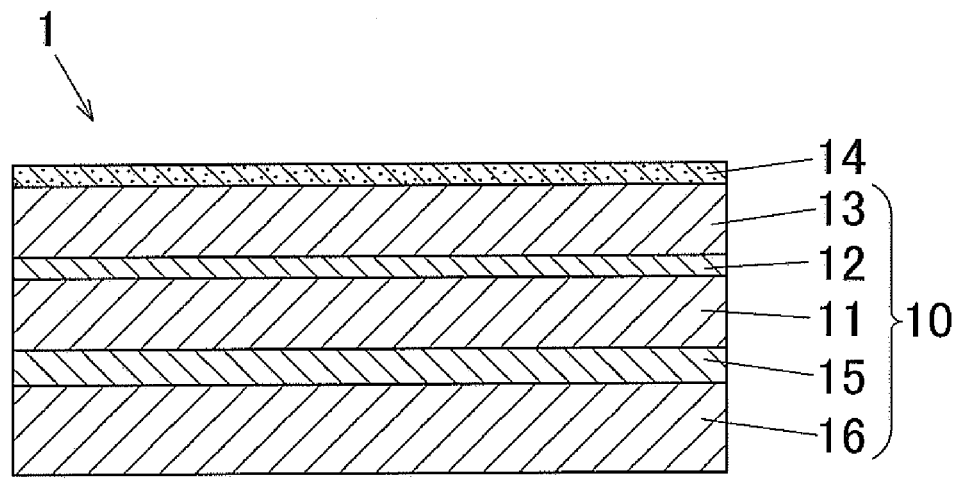
FIG. 1 is a cross-sectional view showing a molding packaging material according to an embodiment of the present invention.

FIG. 1 shows an embodiment of a molding packaging material 1 according to the present invention. The molding packaging material 1 is used as a packaging material for lithium ion secondary battery cases. That is, the molding packaging material 1 is subjected to molding, such as, e.g., deep-drawing, and used as a secondary battery case.

In the molding packaging material 1, an outer base material 13 is integrally laminated on one of surfaces of a metal foil layer 11 via an outer adhesive agent layer 12, and a matte coat layer 14 is formed on an outer surface of the outer base material 13 which is one side of the outer base material opposite to the other side thereof on which the metal foil layer 11 is arranged. Also, an inner sealant layer 16 is integrally laminated on the other surface of the metal foil layer 11 via an inner adhesive agent layer 15.

Hereinafter, each layer will be explained in detail.

(Outer Base Material)

The outer base material 13 is made of a heat-resistant resin. Although the type of the resin is not especially limited, for example, a polyamide film and a polyester film can be exemplified as the outer base material 13, and a stretched film thereof can be preferably used. Among them, in terms of formability and strength, it is especially preferable to use a biaxially-stretched polyamide film, a biaxially-stretched polybutylene terephthalate (PBT) film, a biaxially-stretched polyethylene terephthalate (PET) film, and a biaxially-stretched polyethylene naphthalate (PEN) film. As the polyamide film, it is not especially limited, but, e.g., a 6 Nylon film, a 6, 6 Nylon film, and a MXD Nylon film can be exemplified. In addition, the outer base material 13 can be formed by a single layer or a multi-layer film in which, e.g., a polyethylene terephthalate film and a polyamide film are laminated.

It is preferable that the thickness of the outer base material 13 is 9 μm to 50 μm. When using a polyester film, it is preferable that the thickness is 9 μm to 50 μm, and when using a polyamide film, it is preferable that the thickness is 10 μm to 50 μm. By setting the thickness to the aforementioned preferable lower limit or higher, sufficient strength can be secured as a packaging material. By setting the thickness to the aforementioned preferable upper limit or lower, stress generated at the time of bulging and deep drawing can be decreased to thereby improve formability.
(Inner Sealant Layer)

The inner sealant layer 16 is made of a thermoplastic resin having excellent chemical resistance against highly corrosive electrolytes used in, e.g., lithium ion secondary batteries, and undertakes a role of giving heat sealing characteristics to the packaging material.

The thermoplastic resin constituting the inner sealant layer 16 is not especially limited, but preferably a thermoplastic resin non-stretched film. The thermoplastic resin non-stretched film is not especially limited, but preferably constituted by a non-stretched film made of at least one type of thermoplastic resin selected from the group consisting of polyethylene, polypropylene, olefin-based copolymer, acid-modification thereof, and ionomer.

It is preferable that the thickness of the inner sealant layer 16 is 20 μm to 80 μm. By setting the thickness to 20 μm or more, generation of pinholes can be sufficiently prevented, and by setting to 80 μm or less, the resin amount used can be reduced to thereby attain cost reduction. Above all, the thickness of the inner sealant layer 16 is preferably set to 30 μm to 50 μm. The inner sealant layer 16 can be a single layer or a multi-layer. As a multi-layer, a three-layer film in which random polypropylene films are laminated on both sides of a block polypropylene film can be exemplified.
(Metal Foil Layer)

The metal foil layer 11 undertakes a role of giving gas barrier characteristics to the molding packaging material 1 to prevent intrusion of oxygen and/or moisture.

As the metal foil layer 11, although not especially limited, for example, an aluminum foil, a copper foil, and a stainless steel foil can be exemplified, and an aluminum foil is generally used. It is preferable that the thickness of the metal foil layer 11 is 20 μm to 100 μm. Since the thickness is 20 μm or more, generation of pinholes at the time of rolling to manufacture the metal foil can be prevented, and since it is 100 μm or less, stress generated at the time of bulging and drawing can be decreased, which in turn can improve formability.

Further, it is also preferable that the metal foil layer 11 has a chemical conversion coating film formed on its surface. The outer layer and the inner layer of the molding packaging material 1 are resin layers, and there is a risk that, from the outside of the case, although it is an extremely small amount, light, oxygen and/or liquid may enter the resin layers, and from the inside thereof, contents (e.g., electrolytes of batteries, food products, pharmaceutical products, etc.) may enter. When these invaders reach the metal foil layer 11, they cause corrosion of the metal foil layer 11. For this phenomenon, by forming a chemical conversion coating film high in corrosion resistance on the surface of the metal foil layer 11, the corrosion resistance of the metal foil layer 11 can be improved.

The chemical conversion coating film is a film which is formed by subjecting the surface of the metal foil to a chemical conversion treatment, and can be formed by, for example, subjecting the metal foil to a chromate treatment or a non-chromic type chemical conversion treatment using a zirconium compound. For example, in the case of a chromate treatment, a water solution of any one of the following mixtures 1) to 3) is applied to the surface of the metal foil to which degreasing processing was executed, and then dried.

1) a mixture of phosphoric acid, chromic acid, and at least one of metal salt of fluoride and non-metal salt of fluoride 2) a mixture of phosphoric acid, any one of an acrylic-based resin, a chitosan derivative resin and a phenol-based resin, and at least one of chromic acid and chrome (III) salt 3) a mixture of phosphoric acid, any one of an acrylic-based resin, a chitosan derivative resin and a phenol-based resin, at least one of chromic acid and chrome (III) salt, and at least one of metal salt of fluoride and non-metal salt of fluoride In the chemical conversion coating film, the adhesion amount of chromium is preferably 0.1 to 50 $mg/m^2$, especially 2 to 20 $mg/m^2$. The chemical conversion coating film having the aforementioned adhesion amount of chromium enables to provide a high corrosion-resistant molding packaging material.

The chemical conversion coating film can be formed on either one of surfaces of the metal foil or on both surfaces thereof. By forming the chemical conversion coating film, the corrosion-resistance of the surface of the metal foil can be improved.
(Outer Adhesive Agent Layer)

The outer adhesive agent layer 12 is a layer for joining the metal foil layer 11 and the outer base material 13.

As an adhesive agent constituting the outer adhesive agent layer 12, although not especially limited, from the viewpoint of excellent adhesive strength between different types of materials, i.e., the outer base material 13, which is a resin layer, and the metal foil layer 11, a two-liquid curing type urethane-based adhesive agent containing, e.g., a polyol component and an isocyanate component can be exemplified. This two-liquid curing type urethane-based adhesive agent is preferably used when adhering especially by a dry laminating method. The polyol component is not especially limited, but, e.g., polyester polyol and polyether polyol can be exemplified. The isocyanate component is not especially limited, but diisocyanate types, such as, e.g., TDI (Tolylene diisocyanate), HDI (Hexamethylene diisocyanate), MDI (Methylenebis (4,1-phenylene) diisocyanate) can be exemplified. The thickness of the outer adhesive agent layer 12 is preferably set to 2 μm to 5 μm, more preferably 3 μm to 4 μm.

In the outer adhesive agent layer 12, as long as it is within a range which does not hinder the effects of the present invention, an anti-blocking agent of an inorganic system or an organic system, or a slip agent of an amide system can be added to the aforementioned constituent resin.
(Inner Adhesive Agent Layer)

The inner adhesive agent layer 15 is a layer for joining the metal foil layer 11 and the inner sealant layer 16.

Although the inner adhesive agent layer 15 is not especially limited, an adhesive agent layer formed by, e.g., a polyurethane-based adhesive agent, an acrylic adhesive agent, an epoxy-based adhesive agent, a polyolefin-based adhesive agent, an elastomer-based adhesive agent, a fluorine-based adhesive agent, and an acid-modified polypropylene adhesive agent can be exemplified. Among them, it is preferable to use an acrylic adhesive agent or a polyolefin-based adhesive agent, and in this case, the electrolyteresistance characteristics and the steam-barrier characteristics of the packaging material 1 can be improved.

(Matte Coat Layer)

The matte coat layer 14 is a layer formed on the outer surface of the outer base material 13 to give excellent slidability to the surface of the molding packaging material 1 to thereby improve formability and to give excellent chemical resistance, solvent resistance, and printability. The matte coat layer 14 is made of a resin composition including a resin component and solid fine particles.

As the resin component of the resin composition, a base component resin containing a phenoxy resin and a urethane resin and a curing agent are used.

In the base component resin, a urethane resin has flexibility and excellent formability, but on the other hand, the chemical resistance and the solvent resistance is not sufficient. On the other hand, a phenoxy resin is a linear macromolecule composed by bisphenol types and epichlorohydrin, having strong stability and excellent thermal stability in a wide range of processing temperatures. Also, since an OH group is contained in the structure, by crosslinking, a resin having better adherence and chemical resistance can be obtained. The phenoxy resin having such characteristics has excellent chemical resistance and solvent resistance, but is inferior to a urethane resin in flexibility. In the present invention, as the base component resin, since two types of resins having contradictory characteristics, i.e., a urethane resin high in flexibility and a phenoxy resin high in chemical resistance and solvent resistance, are mixed, the resin composition has formability, chemical resistance, and solvent resistance. In addition, for the phenoxy resin, either a bisphenol A type phenoxy resin or a bisphenol F type phenoxy resin can be used and they can be used together, but it is recommended to use a bisphenol A type phenoxy resin in view of the excellent solvent resistance.

A urethane resin is extremely good in printability and a phenoxy resin is also good in printability, and therefore the mixture resin thereof is also good in printability.

In the base component resin, as the content rate of the urethane resin increases, flexibility increases, which improves formability, but the content rate of the phenoxy resin decreases relatively, which in turn results in decreased chemical resistance and solvent resistance. To the contrary, as the content rater of the phenoxy resin increases, the chemical resistance and solvent resistance improves, but the content rate of the urethane resin decreases relatively, which in turn deteriorates the degree of improvement in formability. In the present invention, although the mixture ratio in the base component resin is not limited, as a well-balanced mixture ratio of formability, chemical resistance, and solvent resistance, it is recommended that the mixture ratio in mass ratio falls within the range of 0.6 to 1.6 urethane resin to 1 phenoxy resin. Especially preferably, the mixture ratio in mass ratio is in a range of 0.8 to 1.4 urethane resin to 1 phenoxy resin.

Although the curing agent is not especially limited, it is preferable to use an isocyanate component. As the isocyanate component, diisocyanate types, such as, e.g., TDI (Tolylene diisocyanate), HDI (Hexamethylene diisocyanate), MDI (Methylenebis (4,1-phenylene) diisocyanate) can be exemplified, and a mixture of one, or a mixture of two or more types of the isocianate components can be used.

It is preferable to blend the curing agent of 5 to 30 mass parts to 100 mass parts of the base component resin. If it is less than 5 mass parts, the adhesion to the outer base material 13 and the solvent resistance may decrease. If it exceeds 30 mass parts, the matte coat layer 14 hardens, which may deteriorate printability and formability. The especially preferable blending amount of the curing agent is 10 to 20 mass parts with respect to 100 mass parts of the base component resin.

Further, as for the physical property of the resin component made of the base component resin and the curing agent, it is preferable that the viscosity of the solution having a solid content concentration of 25 mass % at 20° C. measured with a #4 Zahn cup is in a range of 10 to 30 seconds, more preferably 15 to 25 seconds.

It should be noted that the present invention does not preclude adding resins other than a phenoxy resin and a urethane resin and/or an additive agent, and allows adding other components as long as formability, chemical resistance, and solvent resistance become impaired.

The solid fine particles in the resin composition are components added to give slidability to the matte coat layer 14 to thereby improve formability. Adding the solid fine particles exerts effects that the packaging materials become hard to stick with each other, resulting in easy handling and that the luster of the resin can be suppressed, resulting in creation of subdued outward appearance.

As such solid fine particles exerting the aforementioned effects, either inorganic fine particles or organic fine particles can be used, two or more types of particles can be mixed, and inorganic fine particles and organic fine particles can be mixed. As the inorganic fine particles that exert the aforementioned effects in an excellent manner, silica, alumina, calcium oxide, calcium carbonate, calcium sulfate, calcium silicate, and carbon black can be exemplified. Among these inorganic fine particles, silica is preferably used. As the organic fine particles exerting the aforementioned effects in an excellent manner, an acrylic acid ester-based compound, a polystyrene-based compound, and an epoxy-based resin, a polyamide-based compound, and their cross-linked product thereof can be exemplified.

Fine particles having an average particle size of 1 μm to 10 μm as a particle size capable of obtaining excellent slidability are preferably used. Among them, fine particles having an average particle size of 2 μm to 5 μm are preferred used. When using fine particles having a particle size of less 1 μm, which is too small, they get buried under the applied liquid and therefore it is required to add a large amount of fine particles to obtain desired characteristics, so it is difficult to obtain sufficient slidability. On the other hand, when using fine particles having a large particle size exceeding 10 μm, the particle size exceeds the applied thickness, which becomes more likely to fall off.

The content rate of the solid fine particles in the resin composition is arbitrarily determined so as to fall within a range of 0.1 to 60 mass % depending on the degree of slidability sought in the packaging material, the particle size, type, etc., of the fine particles to add. If the content rate is less than 0.1 mass %, the improvement effect of slidability is insufficient and therefore enough improvement effect of formability may not be obtained. On the other hand, if excessively contained exceeding 60 mass %, there is a concern that the outer appearance may be spoiled. The preferable range of the content of fine particles is 5 to 55 mass %, more preferably 20 to 50 mass %. When using silica, for example, as inorganic fine particles, if the particle size and the content are within the upper and lower limit ranges described above, the optimum slidability can be obtained.

The thickness of the matte coat layer 14 after curing is preferably 1 to 10 μm. In a layer thinner than the lower limit, the slidability improvement effect is small, and in a layer thicker than the upper limit, the cost increases. The especially preferable thickness is in a range of 2 to 5 μm.

(Manufacturing Molding Packaging Material)

The molding packaging material 1 having each of the aforementioned layers can be manufactured by bonding the outer base material 13 on one of the surfaces of the metal foil layer 11 via the outer adhesive agent layer 12 and an inner sealant layer 16 on the other of the surfaces via the inner adhesive agent layer 15 to manufacture a 5-layer laminated member 10 and by applying and drying a paste-like resin composition for the matte coat layer 14 on the surface of the outer base material 13 of the laminated member 10.

In manufacturing the laminated member 10, the bonding method of each layer is not limited, but a method called "dry lamination" can be exemplified. Specifically, an adhesive agent of the outer adhesive agent layer 12 is applied to one of surfaces (upper surface in the drawing) of the metal foil layer 11 or the metal foil layer 11 side (lower surface in the drawing) of the outer base material 13, or both of the surfaces, and after evaporating the solvent to obtain a dried coating film, the metal foil layer 11 and the outer base material 13 are bonded. Bonding of the metal foil layer 11 and the inner sealant layer 16 can be performed in a similar manner, i.e., an adhesive agent of the inner adhesive agent layer 15 is applied to the other surface (lower surface in the drawing) of the metal foil layer 11 or the metal foil layer 11 side (upper surface in the drawing) of the inner sealant layer 16, or both of the surfaces, and after evaporating the solvent to obtain a dried coating film, the metal foil layer 11 and the inner sealant layer 16 are bonded. Furthermore, by curing the adhesive agent depending on the curing condition thereof, a 5-layer laminated member 10 can be manufactured. Also, the laminated member 10 can be also manufactured by a T-die method, in which the outer base material 13 and the outer adhesive agent layer 12, and the inner sealant layer 16 and the inner adhesive agent layer 15 are extruded as a laminated film, respectively, and these laminated films are thermocompressing-bonded to the metal foil layer 11. Alternatively, the laminated films can be bonded to both surfaces of the metal foil layer 11 with any method different from the aforementioned methods.

On the other hand, as a material for the matte coat layer 14, a mixed resin in which a phenoxy resin and a urethane resin are mixed is prepared, and the paste-like resin composition in which solid fine particles are evenly dispersed in the mixed resin is prepared.

Then, the resin composition is applied to the surface of the outer base material 13 of the laminated member 10 and then dried. The application method of the resin composition is not limited, but, e.g., a gravure roll method can be exemplified. By drying the resin composition, the matte coat layer 14 is formed and the matte coat layer 14 is bonded to the outer base material 13, and therefore a desired molding packaging material 1 is manufactured.

Figure 2:
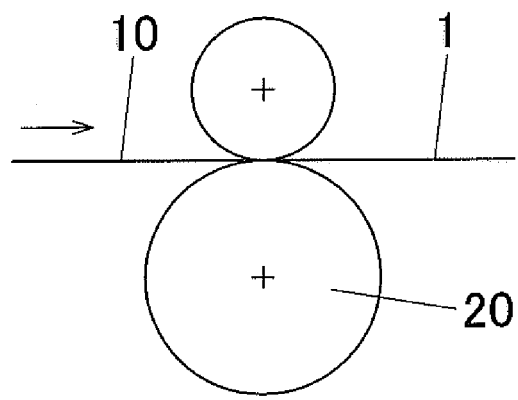
FIG. 2 is a schematic explanatory view showing a manufacturing method of a molding packaging material according to the present invention.

As a drying method of the applied resin composition, as shown in FIG. 2, a method in which the laminated member 10 with the applied resin composition is heated by heat rolls 20 while passing through between the rolls 20 can be exemplified. In this method, the roll contacting the resin composition is constituted by a heat roll 20, and the heat roll 20 is heated to a temperature of, for example, 130 to 220° C.

It should be noted that, in the molding packaging material of the present invention, the bonding method of each layer and the forming method of the matte coat layer are not limited to the aforementioned methods or processes, and the packaging material manufactured by other methods or processes are also included in the present invention.

[Molding Case]

By molding (deep-drawing, bulging, etc.) the molding packaging material 1 of the present invention, a molded case (battery case, etc.) can be obtained.

EXAMPLES

Next, specific examples of the present invention will be explained, but it should be understood that the present invention is not limited to these examples.

A molding packaging material 1 having the laminate structure shown in FIG. 1 was manufactured. The molding packaging materials 1 of Examples 1 to 6 and Comparative Examples 1 and 2 differed only in the resin composition constituting the matte coat layer 14, and the material and the manufacturing steps of the laminated member 10 excluding the matte coat layer 14 were in common in each Example. The material and manufacturing of the laminated member 10 were as follows.

<Laminated Member>

The metal foil layer 11 was an aluminum foil having a thickness of 35 μm, and on both sides of the aluminum foil, a chemical conversion treatment solution containing polyacrylic acid, trivalent chrome compound, water, and alcohol was applied and dried at 180° C. to form a chemical conversion coating film. The adhesion amount of chromium in this chemical conversion coating film was 10 mg/m$^2$.

On one of the surfaces of the metal foil layer 11 on which the chemical conversion coating film was formed, a biaxially-stretched 6 Nylon film having a thickness of 15 μm as an outer base material 13 was dry-laminated using a two-liquid curing type urethane-based adhesive agent as an outer adhesive agent layer 12.

A maleic anhydride-modified polypropylene resin which is adhesive to both the metal foil layer 11 and polypropylene as an adhesive agent of the inner adhesive agent layer 15, and an ethylene-propylene random copolymer resin having a melting point of 140° C. and MFR of 7 g/10 min as an inner sealant layer 16 were extruded by a T-die method into a laminated film having a 7 μm maleic anhydride-modified polypropylene resin layer and a 28 μm ethylene-propylene random copolymer layer. That is, this laminated film was a film in which the inner sealant layer 16 and the inner adhesive agent layer 15 were laminated.

Next, on the other surface of the metal foil layer 11, the inner adhesive agent layer 15 of the laminated film was laminated and passed through heat rolls heated to 150° C. to obtain the laminated member 10.

The manufactured laminated members 10 were commonly used to manufacture the molding packaging material in each Example.

Examples 1 to 6

A phenoxy resin and a urethane resin were mixed at the mass ratio shown in Table 1 to obtain a base component resin; Tolylene diisocyanate (TDI) and hexamethylene diisocyanate (HDI) were mixed at the mass ratio of 1:1 to obtain a curing agent; and 15 mass parts of a curing agent were blended with respect to 100 mass parts of the base component resin to obtain a resin component. Then, in the resin composition for the matte coat layer 14, silica having an average particle diameter of 2 μm was blended in the resin component at the content rate shown in Table 1 and then dispersed evenly.

On the surface of the outer base material 13 of the laminated member 10, the prepared resin composition was applied using a gravure roll and then dried to form a matte coat layer 14. The thickness of the matte coat layer 14 after drying was 3 μm. In this way, the molding packaging material 1 was obtained.

Comparative Example 1

A molding packaging material 1 was obtained in a similar manner as Examples 1 to 6 except that a resin composition in which, in place of the base component resin in Examples 1 to 6, a urethane resin was dissolved in methyl ethyl keton and the mixed amount of the curing agent was set to 10 mass parts was used as the resin composition for the matte coat layer 14.

Comparative Example 2

A molding packaging material 1 was obtained in a similar manner as in Examples 1 to 6 except that as the resin composition for the matte coat layer 14, in place of the base component resin of Examples 1 to 6, a copolymer of tetrafluoroolefin and carboxylic acid vinylester was used, and the mixed amount of the curing agent was set to 10 mass parts, the molding packaging material 1 was obtained.

In the resin component of the resin composition for the matte coat layer 14 in each Example, the viscosity was measured by measuring the 25 mass % solid content concentration solution at 20° C. using a Zahn cup #4. The measured values are shown in Table 1.

Furthermore, for each molding packaging material obtained in the aforementioned manner, performance evaluations were conducted based on the following evaluation methods. The results are shown in Table 1.

<Formability Evaluation Method>

Using a bulging forming machine made by Amada Co., Ltd. (Product Number: TP-25C-X2) to subject a molding packaging material to a bulging molding process into a rectangular shape of length 55 mm×width 35 mm×depth 8 mm, pinholes and crackings at a corner R part of the molded product were observed and the formability was evaluated based on the following criteria.

(Criteria)

"⊚" . . . pinholes were not generated at all, and cracks did not occur at all.

"○" . . . pinholes were not generated at all, but the matte coat layer became slightly white and cloudy "Δ" . . . pinholes were generated slightly in a small fractional portion, but there were essentially none "x" . . . pinholes and cracks were generated at the corner R part <Solvent Resistance Evaluation Method>

The molding packaging material was cut into a 10 cm×10 cm test piece. After dripping 1 ml of ethanol onto the matte coat layer 14 of the test piece, the droplet adhered portion was rubbed a maximum of 10 times in both ways using a sliding member in which cotton was wound to a diameter of 1 cm at the tip portion and to a weight weighing 1 kg, and the solvent resistance was evaluated by visually observing the outer appearance.

(Criteria)

"⊚" . . . there were no changes to the outer appearance after 10 times rubbing in both ways "○" . . . there were changes to the outer appearance after 8 times rubbing in both ways "Δ" . . . there were changes to the outer appearance after 5 times rubbing in both ways "x" . . . there were changes to the outer appearance after 1 time rubbing in both ways <Printability Evaluation Method>

On a surface of the matte coat layer 14, a bar code was printed with white ink using an ink-jet printer. The dot size of the printed ink jet was 0.428 mm in diameter and the measurement of the bar code was 4.5 mm×3.5 mm. Then it was determined whether or not the bar code can be read by a bar code reader and the existence of dots and blurring of lines were examined by visual observation for evaluation.

(Criteria)

"⊚" . . . Readable, No blurring.

"○" . . . Readable, Occurrence of slight blurring.

"Δ" . . . Readable, Occurrence of blurring.

"x" . . . Not readable, Occurrence of blurring

|  | Resin Composition of Matte Coat Layer | | | | | | Performance Evaluation Examination | | |
|---|---|---|---|---|---|---|---|---|---|
|  | Base Component Resin Mass Ratio | | | Mixture Ratio of | Base Composition | Solid Fine | | | |
|  | Phenoxy Resin | Urethane Resin | Fluorine resin | Curing Agent (mass parts) | Resin Viscosity (sec) | Particle Content Rate (mass %) | Formability | Solvent resistance | Printability |
| Ex. 1 | 1 | 0.6 |  | 15 | 14 | 20 | Δ | ⊚ | Δ |
| Ex. 2 | 1 | 0.8 |  | 15 | 15 | 20 | ○ | ⊚ | Δ |
| Ex. 3 | 1 | 0.9 |  | 15 | 15 | 20 | ○ | ⊚ | Δ |
| Ex. 4 | 1 | 1.2 |  | 15 | 16 | 20 | ⊚ | ⊚ | ○ |
| Ex. 5 | 1 | 1.4 |  | 15 | 16 | 20 | ⊚ | ○ | ○ |
| Ex. 6 | 1 | 1.6 |  | 15 | 17 | 20 | ⊚ | Δ | ○ |
| Comp. Ex. 1 |  | 1 |  | 10 | 20 | 20 | ⊚ | X | ⊚ |
| Comp. Ex. 2 |  |  | 1 | 10 | 14 | 20 | ○ | ⊚ | X |

As it is apparent from the results of the performance evaluation of Table 1, the molding packaging material of Examples 1 to 6 of the present invention had excellent formability, solvent resistance, and printability. On the other hand, Comparative Examples 1 and 2, in which the resin component of the matte coat layer was outside the technical range of the present invention, was inferior in one of formability, solvent resistance, and printability.

The present invention claims priority to Japanese Patent Application No. 2013-98136 filed on May 8, 2013 and Japanese Patent Application No. 2014-47426 filed on Mar. 11, 2014, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

INDUSTRIAL APPLICABILITY

The molding packaging material of some specific embodiment of the present invention can be preferably used as a battery case for, e.g., lithium ion secondary batteries, a packaging material for food products, and/or a packaging material of pharmaceutical products.

EXPLANATION OF SYMBOLS

1 . . . molding packaging material
11 . . . metal foil layer
12 . . . outer adhesive agent layer
13 . . . outer base material
14 . . . matte coat layer
15 . . . inner adhesive agent layer
16 . . . inner sealant layer

The invention claimed is:

1. A molding packaging material comprising:
an outer base material made of a heat-resistant resin;
an inner sealant layer made of a thermoplastic resin;
a metal foil layer arranged between the outer base material and the inner sealant layer; and
a matte coat layer formed on one side of the outer base material opposite to the other side thereof on which the metal foil layer is arranged; wherein
the matte coat layer is made of a resin composition containing a base compound resin including a phenoxy resin and a urethane resin, a curing agent, and solid fine particles,
a mass ratio of the phenoxy resin and the urethane resin in the base compound resin is 0.6 to 1.6 urethane resin to 1 phenoxy resin,
an average particle size of the solid fine particles is 1 to 10 μm,
a content rate of the solid fine particles in the resin composition is 0.1 to 60% by weight,
the curing agent is an isocyanate component, and
a blending amount of the curing agent is 5 to 30 mass parts to 100 mass parts of the base compound resin.

2. The molding packaging material as recited in claim 1, wherein the mass ratio of the phenoxy resin and the urethane resin is 0.8 to 1.4 urethane resin to 1 phenoxy resin.

3. The molding packaging material as recited in claim 1, wherein the solid fine particles contains one or more types of inorganic fine particles selected from the group consisting of silica, alumina, calcium oxide, calcium carbonate, calcium sulfate, calcium silicate, and carbon black.

4. The molding packaging material as recited in claim 1, wherein the solid fine particles contain one or more types of organic fine particles selected from the group consisting of an acrylic acid ester-based compound, a polystyrene-based compound, an epoxy-based resin, a polyamide-based compound, a cross-linked substance of an acrylic acid ester-based compound, a cross-linked substance of a polystyrene-based compound, a cross-linked substance of an epoxy-based resin, and a cross-linked substance of a polyamide-based compound.

5. The molding packaging material as recited in claim 1, wherein the outer base material is constituted by a biaxially-stretched polyamide film.

6. The molding packaging material as recited in claim 1, wherein the outer base material is constituted by a biaxially-stretched polyethylene terephthalate film.

7. The molding packaging material as recited in claim 1, wherein the outer base material is constituted by a multi-layer film in which a polyethylene terephthalate film and a polyamide film are laminated.

8. The molding packaging material as recited in claim 1, wherein the inner sealant layer is constituted by a thermoplastic resin non-stretched film.

9. The molding packaging material as recited in claim 1, wherein the outer base material and the metal foil layer are joined by a two-liquid curing type urethane-based adhesive agent containing a polyol component and an isocyanate component.

10. The molding packaging material as recited in claim 1, wherein a chemical conversion coating film is formed on at least one of surfaces of the metal foil.

11. The molding packaging material as recited in claim 1, wherein the metal foil layer is constituted by an aluminum foil.

12. The molding packaging material as recited in claim 1, wherein a viscosity of a solution including the base compound resin and the curing agent of the resin composition and having a solid content concentration of 25% by weight at 20° C. measured with a #4 Zahn cup is in a range of 10 to 30 seconds.

13. A molded case formed by deep-drawing or bulging a molding packaging material, wherein the molding packaging material comprises:
an outer base material made of a heat-resistant resin;
an inner sealant layer made of a thermoplastic resin;
a metal foil layer arranged between the outer base material and the inner sealant layer; and
a matte coat layer formed on one side of the outer base material opposite to the other side thereof to which the metal foil layer is arranged, wherein
the matte coat layer is made from a resin composition containing a base compound resin including a phenoxy resin and a urethane resin, a curing agent, and solid fine particles,
a mass ratio of the phenoxy resin and the urethane resin in the base compound resin is 0.6 to 1.6 urethane resin to 1 phenoxy resin,
an average particle size of the solid fine particles is 1 to 10 μm,
a content rate of the solid fine particles in the resin composition is 0.1 to 60% by weight,
the curing agent is an isocyanate component, and
a blending amount of the curing agent is 5 to 30 mass parts to 100 mass parts of the base compound resin.

14. A molded case as recited in claim 13 to be used as a battery case.

* * * * *